United States Patent [19]
Krznaric

[11] Patent Number: 5,613,425
[45] Date of Patent: Mar. 25, 1997

[54] STIRRING APPARATUS

[76] Inventor: Mile Krznaric, 204 Fifth Ave., Estell Manor, N.J. 08319

[21] Appl. No.: 672,080

[22] Filed: Jun. 26, 1996

[51] Int. Cl.⁶ .......................... A47J 27/00; A47J 36/32; B01F 7/16; B01F 7/20
[52] U.S. Cl. .................. 99/348; 99/423; 366/249; 366/279; 366/282; 366/607
[58] Field of Search ................ 99/348, 327–332, 99/344, 353, 423, 443 C; 366/242–254, 279, 285, 325.1, 332, 289, 255–260, 312, 342, 343, 607

[56] References Cited

U.S. PATENT DOCUMENTS

| | | | |
|---|---|---|---|
| 1,703,956 | 3/1929 | Royer | 366/607 |
| 1,983,788 | 12/1934 | Brennan | 68/15 |
| 2,798,702 | 7/1957 | Fjellstedt | 366/607 |
| 2,805,843 | 9/1957 | Block | 259/135 |
| 3,128,083 | 4/1964 | Blair | 259/107 |
| 3,132,849 | 5/1964 | Kritikson | 259/107 |
| 3,212,672 | 10/1965 | Kromhout et al. | 222/56 |
| 3,357,685 | 12/1967 | Stephens | 259/122 |
| 3,810,605 | 5/1974 | Lambert | 259/108 |
| 3,952,862 | 4/1976 | McCorkel | 366/607 |
| 4,151,792 | 5/1979 | Nearhood | 99/348 |
| 4,184,779 | 1/1980 | Detmer | 99/348 |
| 4,337,583 | 7/1982 | Harris | 366/300 |
| 4,339,992 | 7/1982 | Kurland | 99/348 |
| 4,504,152 | 3/1985 | Muller et al. | 366/189 X |
| 4,693,610 | 9/1987 | Weiss | 99/348 X |
| 4,721,036 | 1/1988 | Brandt et al. | 99/348 |
| 4,856,910 | 8/1989 | Cuschera | 366/251 X |
| 5,129,316 | 7/1992 | Calderon | 99/348 X |
| 5,176,069 | 1/1993 | Chen | 99/348 |
| 5,193,441 | 3/1993 | Hayashi | 99/348 |
| 5,201,263 | 4/1993 | Teng | 99/335 |
| 5,372,422 | 12/1994 | Dubroy | 366/251 X |
| 5,497,695 | 3/1996 | Canela | 99/335 |

Primary Examiner—Timothy F. Simone
Attorney, Agent, or Firm—Lennox & Murtha, P.A.

[57] ABSTRACT

An automatic stirring apparatus for stirring food simmering on a stove, such as gravy in a cooking vessel with a peripheral upper edge including a vertical rotating drive shaft driven through gears by an electric motor in a housing supported on the upper edge of the vessel with a stirring device on a lower end of the shaft that includes lengths of chain connected elements extending horizontally in opposite directions from the shaft, the elements allowing full upward vertical rotational movement of each element of the chain while preventing all horizontal movement of each element allowing a lower surface of the chain to conform to any cooking surface in the vessel.

4 Claims, 2 Drawing Sheets

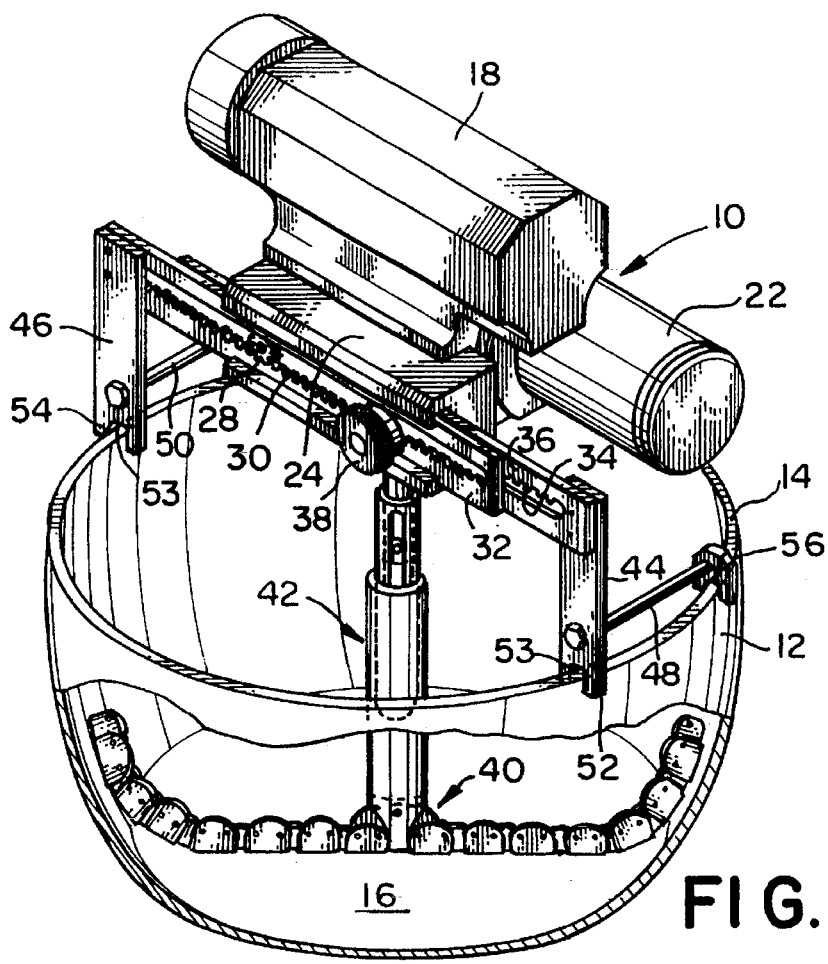
FIG. 1
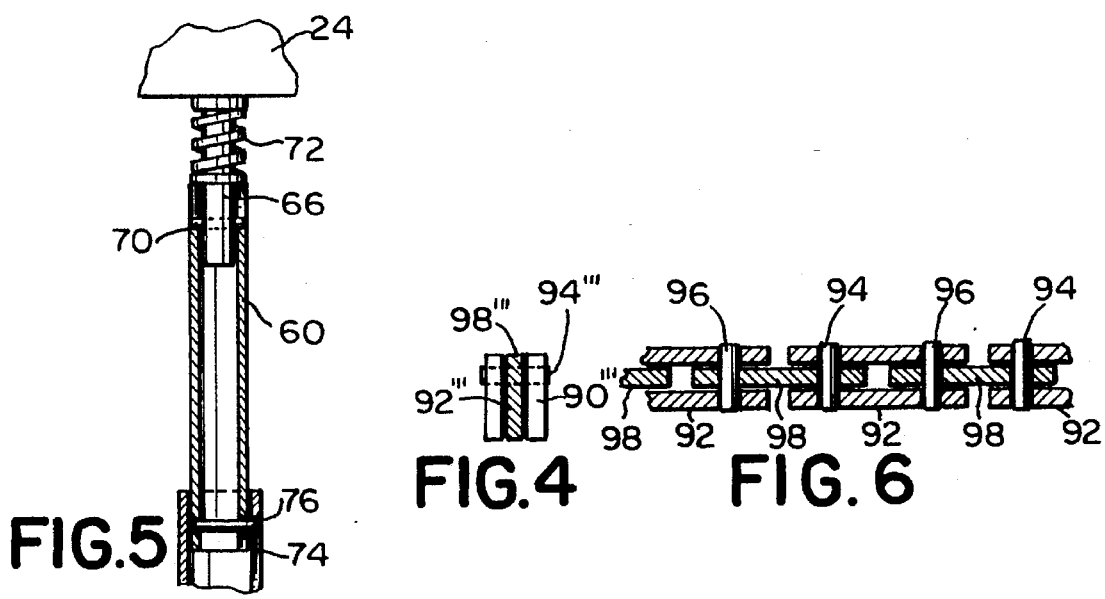
FIG. 5
FIG. 4
FIG. 6

STIRRING APPARATUS

BACKGROUND OF THE INVENTION

This invention involves an automatic stirring apparatus, and more particularly, an apparatus for stirring food such as gravy, puddings, or sauces.

It is well-established that many recipes require almost continuous stirring while the liquid is being cooked. For example, the preparations of puddings and sauces, the ingredients are placed in a saucepan or other utensil and cooked for a period of time for thickening during which they must be constantly stirred to avoid scorching and checked frequently to prevent the contents from boiling over. Many sauces and soups must be slowly heated to avoid scalding or burning at the bottom, particularly when they are prepared with milk which develops unpleasant characteristics if they are not properly prepared. A slow and continuous stirring of the foods may produce a smooth product rather than one that is lumpy or contains lumps of overheated or scalded skin formation. In particular, preparation of gravy, such as meat based spaghetti sauce requires an extremely long cooking time and the constant stirring requirements are a drudgery.

There is a need for an effective stirring apparatus that will allow the preparer to take care of other tasks while the gravy is being stirred.

A number of devices have been described in United States Patents directed to the general need for stirring pots with varying degrees of success. U.S. Pat. No. 3,357,685 to Stephens describes a battery operated stirring unit for saucepans includes a vertical stirring shift with a crossbar stirrer to which diagonally positioned stirring blades extend downwardly to stir the sauce. The stirring shaft of Stephens includes a spring to bias the stirrer downwardly to adjust to the size of the pan. In U.S. Pat. No. 3,810,605 to Lambert, an electrically powered stirrer for cooking vessels rests on the rim of the pan and utilizes diagonally adjusted paddles for stirring the sauce. In U.S. Pat. No. 4,184,779 to Detmer, a stirring device which rests on the upper edge of the pan utilizes an adjustable length horizontal agitator blade. The stirring apparatus described in U.S. Pat. No. 4,339,992 to Hurland, fits on the top rim of a cooking pot and employs a paddle revolving on a vertical shift. In U.S. Pat. No. 3,128,083 to Blair, an agitator for plaster making kettles is described wherein the agitator is designed to conform to a convex bottom of the kettle and is constructed of a plurality of cast iron agitator blocks or beads threaded loosely on a cable pulled through the plaster by the blade. The beads are threaded and rotateable on the cables and are positioned closely together to semi-stiffen the flexible cable to that it will maintain the converted configuration. In U.S. Pat. No. 3,132,849 to Kritikson, a cooking utensil stirrer employees pivotable horizontal feet with a cross spring secured around the feet to act as a stirrer. In U.S. Pat. No. 2,805,843 to Block, a stirring apparatus that clamps onto the edge of a cooking pot employees a horizontal stirring blade with depending teeth. The attachment for washtubs described in U.S. Pat. No. 1,983,788 to Brennan, utilizes a vertical shaft with a vertically positioned agitator blade. In U.S. Pat. No. 3,212,672 to Kromhout, et al, a dry diatomaceous earth feeding apparatus includes a fairly heavy chain which hangs vertically from the outer end of a radius arm close to the side wall of the container to ensure sweeping all material from the side wall and from the funnel-shaped bottom of the container. The chain is wrapped around the shaft to form an auger disposed vertically to aid in the feeding of the earth.

The cooker and mixer apparatus described in U.S. Pat. No. 4,151,792 to Neared, utilizes four paddles attached to a central rotating hub. The automatic stirring device described in U.S. Pat. No. 5,201,263 to Teng, with a spring loaded telescoping vertical shaft to which stirring blades are attached.

None of these devices totally satisfy the needs described above nor attains the objects described herein below.

SUMMARY OF INVENTION

It is an object of the protection sought to provide an improved food stirrer which is attachable on the top of the cooking utensil with a stirrer that conforms to the exact shape of the top surface of the inside of the utensil.

It is a particular object of the protection sought to provide a stirring apparatus that essentially continuously scrapes the bottom and near sides of the cooking utensil which sauce is being cooked.

It has been noted that cooking pots sometimes become slightly deformed by use presenting raised and lowered sections of the inside bottom surface of the cooking utensil. It is an object of the protection sought to provide a stirrer that will conform to these uneven sections of the utensil.

It is a further object of the protection sought to provide a stirring apparatus that will conform to the inside bottom surface of the cooking utensil whether it be convex, concave, or a combination thereof.

It is an additional object of the protection sought to provide a stirring apparatus that will automatically conform to the size of the inside of the utensil, including the diameter and the depth of the vessel.

It is a particular object of the protection sought to provide a stirring apparatus that will allow cooking of sauces to go essentially unattended for hours.

It is a further object of the protection sought to provide a stirrer that can be easily removed from the stirring unit and easily washed and cleaned for repeated use.

An aspect of the invention is an apparatus for stirring fluid contents in a cooking vessel that includes an top opening with a peripheral upper edge. The apparatus includes a vertically positioned horizontally rotateable drive shaft that includes an upper end section and a lower end section, drive means to which the upper end section of the drive shaft is attached to cause the drive shaft of rotate, and support means attached to the drive means to hold the apparatus in the top opening resting on the peripheral upper edge of the vessel. The apparatus further includes stirring means attached to the lower end section of the drive shaft, said means including a pair of lengths of chain connected elements, a first length extending horizontally along a line in a first direction from the lower end section and a second length extending horizontally along the same line from the lower end section in an opposite direction. The stirring means allows essentially full upward vertical rotational movement of each element of the chain with respect to each adjacent element, prevents essentially all horizontal movement of each element of the chain with respect to each adjacent element, and allows the achievement of a lower surface of the lengths of the chain to abut and conform to essentially any upper surface of a cavity of the cooking vessel.

It is preferred that the drive means include a battery powered electric motor. It is further preferred that the drive shaft be a telescoping shaft that drops down to adjust to a depth of the cooking vessel.

Another aspect of the invention is an apparatus for stirring the contents of a cooking vessel as described herein above. The apparatus includes a drive shaft, drive means, and support means, all as-described herein above. The apparatus further includes a stirring device attached to the lower end section of the drive shaft that includes a pair of lengths of chain connected elements, a first length extending horizontally along a line in a first direction from the lower end section and a second length extending horizontally along the same line from the lower end section in an opposite direction. The lengths of chain each include a plurality of repeating link sections each including a link. Each link includes a pair of vertically disposed panel members, each panel member including vertical sides, an essentially flat horizontal bottom edge, an arcuate upper edge, a front end and a rear end. Each link section further includes a front horizontally disposed pin member proximate the front ends of the vertically disposed panel members and a rear horizontally disposed pin member proximate the rear ends of the vertically disposed panel members joining said vertically disposed members with adjacent sides spaced apart in juxtaposition. Each link section further includes a joining link member that includes an essentially flat horizontal bottom edge, an arcuate upper edge, a front end, a rear end, a front horizontal hole proximate the front end, and a rear horizontal hole proximate the rear end. Each joining link member being interposed between the pair of vertically disposed members with the front pin member extending through the rear hole. The size of the hole in the joining link member allows the joining link member and the link to swing freely in a vertical arc with respect to each other. The link sections are joined together by engaging the rear pin member of the link through the front horizontal hole of each adjacent joining link member to form the lengths of chain.

BRIEF DESCRIPTION OF THE DRAWINGS

FIG. 1 is a top perspective view of a stirring apparatus of the present invention or a cooking pot which is partially cut away to show the stirrer.

FIG. 4 is a vertical cross-sectional view taken along lines 4—4 of FIG. 2 through a section of the stirrer.

FIG. 5 is a vertical cross-sectional view taken along lines 5—5 of FIG. 2 through the stirrer drive shaft.

DESCRIPTION OF PREFERRED EMBODIMENTS

Figure 2:
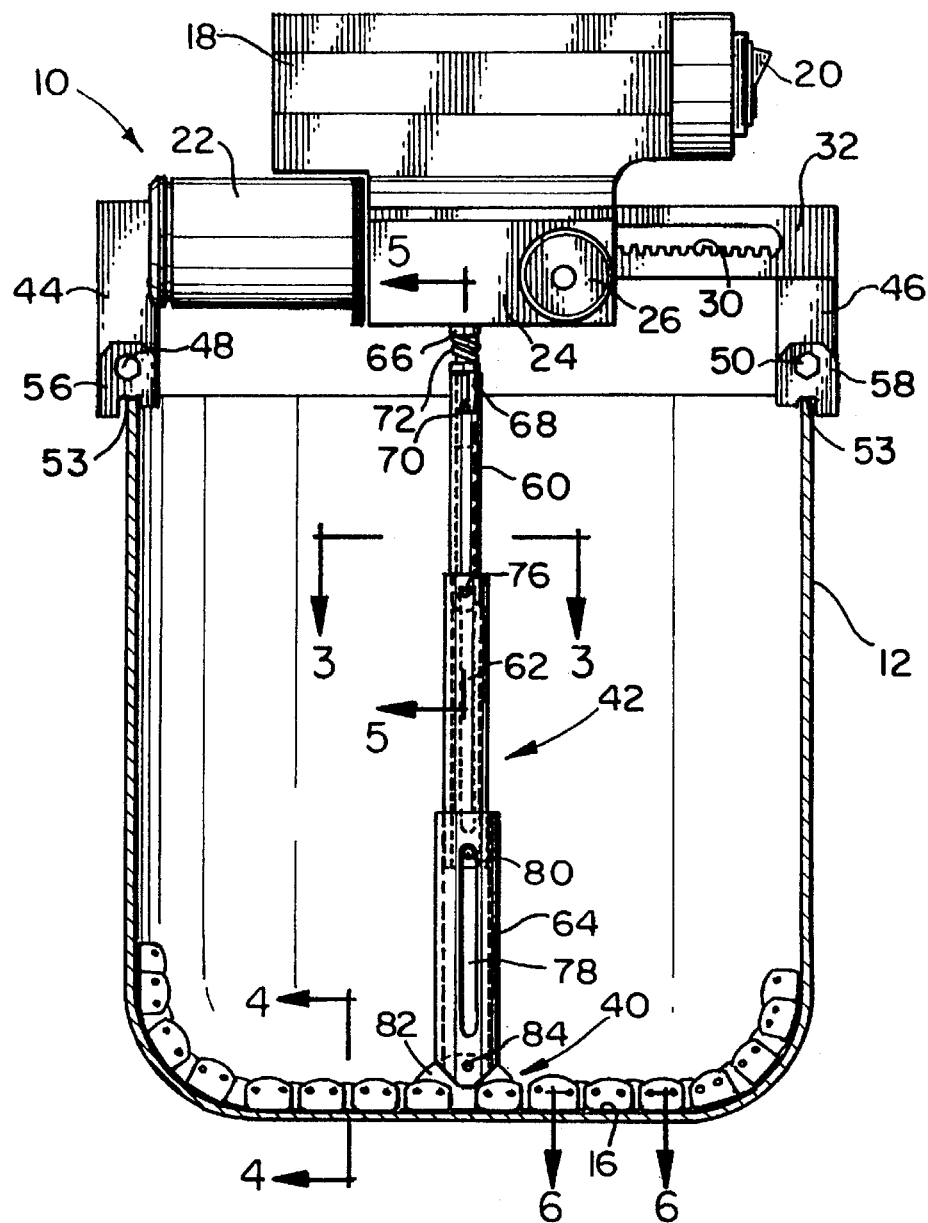
FIG. 2 is a front elevational view of the apparatus shown in FIG. 1, with the cooking pot cut away by a vertical section.
Figure 3:
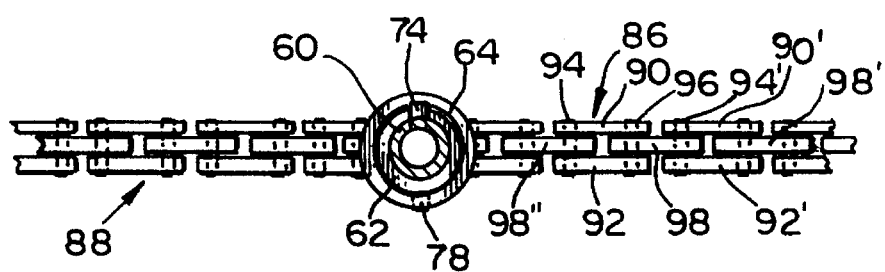
FIG. 3 is a horizontal cross-sectional view taken along lines 3—3 of FIG. 2 looking downwardly on a portion of the stirrer.

Stirrer apparatus 10 is illustrated in FIGS. 1 and 2 and parts of it are illustrated in the remaining figures. Apparatus 10 is designed to stir liquids in cooking utensils such as open topped pot 12 with upper peripheral rim 14 and an interior cooking surface that includes bottom upper surface 16, which is heated directly and poses the greatest risk of burning and coating during the cooking process. As is shown in FIG. 2, surface 16 is essentially flat in a central section and curves upwardly with concave side edges which are easily "scraped" by stirrer device 40. Apparatus 10 includes upper battery housing 18 molded of high temperature resistant plastic, such as DELRIN® or like engineering plastic materials. A standard rechargeable battery system is operable by switch 20 to drive an electric motor in housing 22 which through a standard gear train rotates vertical drive shaft device 42 to turn stirrer device 40. Support housing 24 is cast aluminum or high temperature engineering plastic to withstand the relatively high temperatures directly above the cooking liquids which may be at temperatures well above the boiling point of water. Housing 24 supports the entire apparatus 10 through arms 32 and 36, which are slideably connected to housing 24, and slide outwardly in opposite directions to adjust to the diameter of the rim of the container to be stirred. Adjustment knob 26 is hand turned to rotate a hidden horizontal shaft to turn pinion gear 28, which is engaged in upwardly depending rack gear 30 of arm 32 as well as downwardly depending rack gear 34 of arm 36. Turning gear 28 in one direction slides arms 32 and 36 outwardly in opposite directions to reach the rim of a larger diameter pot and in the opposite direction to slide the arms closer together for a smaller pot. Locking turn knob 38 tightens the arms together and locks their relative position during the cooking process. At the outer ends of slide members 32 and 36 vertical support arms 46 and 44 are attached and depend downwardly terminating at bracket foot shapes 54 and 52 respectively, which include notches 53 which open downwardly and interfit over rim 14 to support device 10. Horizontal cantilever support arms 50 and 48 are attached to arms 44 and 46, respectively, extending outwardly and terminating at bracket feet 58 and 56, respectively, which again include notches 53 to interfit over rim 14. By adjusting knob 26 it is a simple task to adjust the position of the bracket foots to interfit and rest on rim 14. Drive shaft device includes upper shaft section 60, middle shaft section 62, and lower shaft section 64, all being tubular and telescoping with the adjoining section. Section 60 slides over and interconnects with drive shaft 66 which is engaged directly with the standard gear mechanism to translate the rotation of the motor to the rotation of drive shaft 66. The connection of section 60 with drive shaft 66 is accomplished by detent shaped opening slot 68 which allows tubular section 60 to slide over shaft 66 with pin 70 engaging slot 68 as section 60 is pushed against spiral spring 66 until the pin reaches the horizontal shoulder section which allows section 60 to be detachably attached. Sections 60, 62, and 64 are all permanently attached together through pins 76 and 78. These horizontal pins engage slots 74 and 78 extending a median length-wise distance along tubular sections 62 and 64 which telescope in increasing sizes from top to bottom and slide easily up and down to adjust for the depth of pot 12. Cantilever pin members 76 and 78 extend outwardly from the lower ends of Sections 60 and 62 riding freely in slots 74 and 78, respectively, not only allowing for the adjustable length capability, but also attaching the sections together. The entire drive shaft device 42 is a series of stainless steel open tubes from end to end allowing easy cleaning. Stirring device 40 is constructed of stainless steel. Stirring device 40 includes center rocker attachment 82 which is attached through pin 84 and is allowed to swing freely in a vertical slot cut upwardly into section 64. Stirrer device 40 is a pair of link chain lengths 88 extending outwardly from rocker member 82 in a plurality of link sections each of which attach rearwardly to a prior link section and frontwardly to the next adjacent link section. Each link section 86 includes left link member 90 and right link member 92, each of which are panel members with essentially vertical side faces and are flat on bottom with an arcuate upper edge. This shape allows members 90 and 92 to come close to the bottom surface 16 of pot 12 while allowing link chain 88 to adjust upwardly and slightly downwardly to conform to any shape. Link members 90 and 92 are connected together with rear pin 94 and front pin 96 which hold the members sufficiently apart to allow joining link member 98 to rotate freely between them as it is joined threaded through a rear hole to front pin 96. Each joining link member 98 has a rear hole through which front pin extends and a front hole through which rear pin 94' of the next link section connects. Likewise, rear pin 94 extends through a front hole of joining link member 98" which is part of the link section immediately preceding link section 86. Joining link member 98 also has an essentially flat bottom with an arcuate upper edge. The bottoms of members 90, 92, and 98 are all essentially in the same plane. A "'" designation is given to those elements of the next succeeding link section in FIG. 3 while the next preceding joining link member 98" is shown as it is positioned prior to link section 86. Likewise, on the opposite length of link chain 88 extending in the opposite direction, as shown in FIG. 4, that link section shows identical elements to that of link section 86 with a "'''" designation.

While this invention has been described with reference to specific embodiments disclosed herein, it is not confined to the details set forth and the patent is intended to include modifications and changes which may come within and extend from the following claims.

I claim:

1. An apparatus for stirring fluid contents in a cooking vessel comprising a top opening with a peripheral upper edge, the apparatus comprising:
   (a) a vertically positioned horizontally rotatable drive shaft comprising an upper end section and a lower end section,
   (b) drive means to which the upper end section of the drive shaft is attached to cause the drive shaft to rotate,
   (c) support means attached to the drive means to hold the apparatus in the top opening resting on the peripheral upper edge of the vessel,
   (d) stirring means attached to the lower end section of the drive shaft, said means comprising a pair of lengths of chain connected elements, a first length extending horizontally along a line in a first direction from the lower end section and a second length extending horizontally along the same line from the lower end section in an opposite direction, the stirring means to:
      (i) allow essentially full upward vertical rotational movement of each element of the chain with respect to each adjacent element,
      (ii) prevent essentially all horizontal movement of each element of the chain with respect to each adjacent element, and
      (iii) allow the achievement of a lower surface of the lengths of the chain to abut and conform to essentially any upper surface of a cavity of the cooking vessel.

2. The apparatus of claim 1 wherein the drive means comprises a battery powered electric motor.

3. The apparatus of claim 1 wherein the drive shaft is a telescoping shaft that drops down to adjust to a depth of the cooking vessel.

4. An apparatus for stirring the contents of a cooking vessel comprising a top opening with a peripheral upper edge, the apparatus comprising:
   (A) a vertically positioned horizontally rotatable drive shaft comprising an upper end section and a lower end section,
   (B) drive means to which the upper end section of the drive shaft is attached to cause the drive shaft to rotate,
   (C) support means attached to the drive means to hold the apparatus in the top opening resting on the peripheral upper edge of the vessel,
   (D) a stirring device attached to the lower end section of the drive shaft comprising a pair of lengths of chain connected elements, a first length extending horizontally along a line in a first direction from the lower end section and a second length extending horizontally along the same line from the lower end section in an opposite direction, the lengths of chain each comprising a plurality of repeating link sections each comprising:
      (a) a link comprising:
         (i) a pair of vertically disposed panel members, each panel member comprising vertical sides, an essentially flat horizontal bottom edge, an arcuate upper edge, a front end and a rear end, and
         (ii) a front horizontally disposed pin member proximate the front ends of the vertically disposed panel members and a rear horizontally disposed pin member proximate the rear ends of the vertically disposed panel members joining said vertically disposed members with adjacent sides spaced apart in juxtaposition, and
      (b) a joining link comprising an essentially flat horizontal bottom edge, an arcuate upper edge, a front end, a rear end, a front horizontal hole proximate the front end, and a rear horizontal hole proximate the rear end, said joining link being interposed between the pair of vertically disposed members with the front pin member extending through the rear hole, wherein the size of the hole in the joining link allows the joining link and the link to swing freely in a vertical arc with respect to each other,
   wherein the link sections are joined together by engaging the rear pin member of the link through the front horizontal hole of each adjacent joining link to form the lengths of chain.

\* \* \* \* \*